United States Patent Office 3,720,557
Patented Mar. 13, 1973

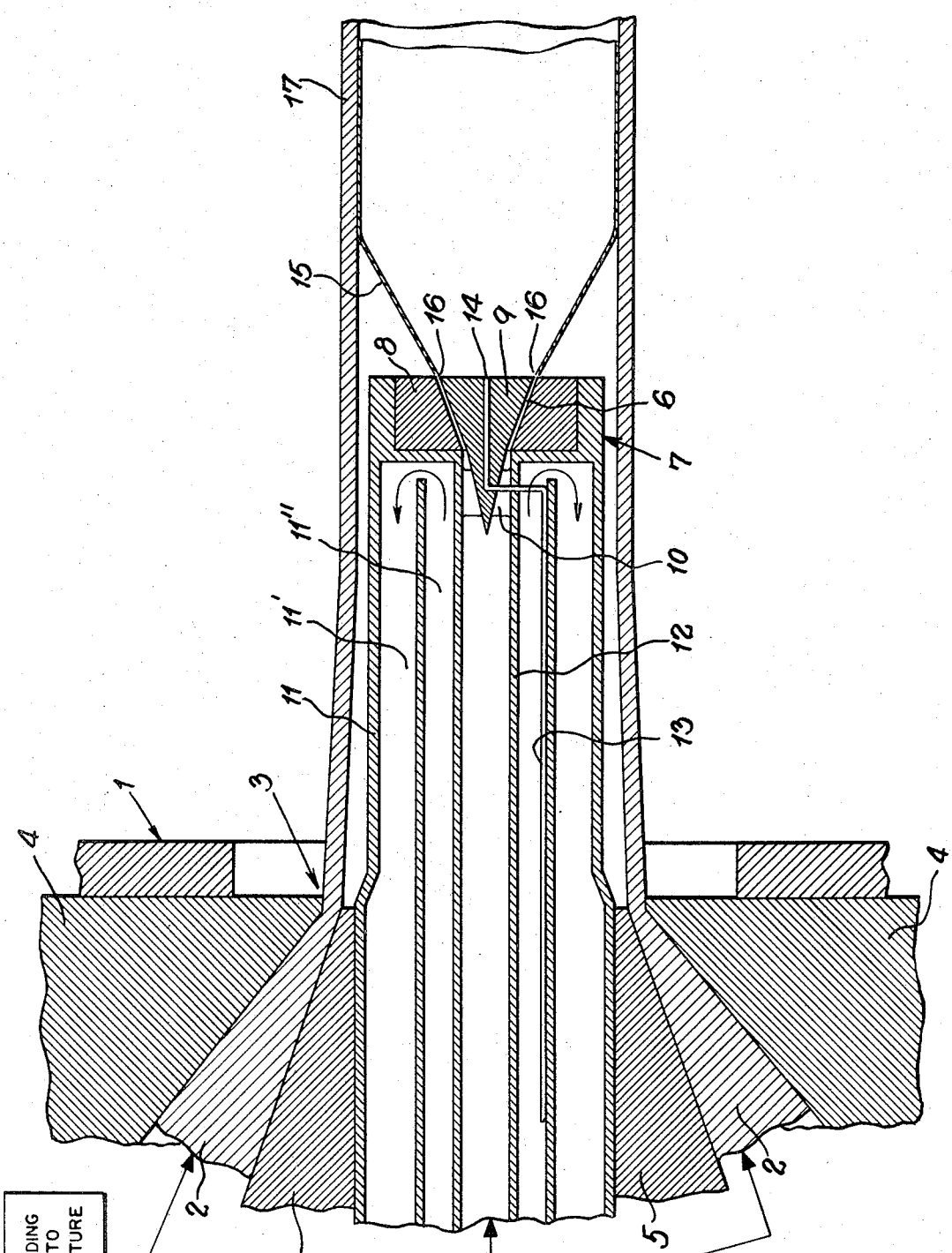

3,720,557
PROCESS FOR LINING CONDUCTIVE TUBES WITH INSULATING MATERIAL
Sergio Longoni, Milan, and Antonio Portinari, Sesto San Giovanni, Italy, assignors to Industrie Pirelli S.p.A.
Filed Oct. 21, 1970, Ser. No. 82,704
Claims priority, application Italy, Mar. 24, 1970, 22,352/70
Int. Cl. B32b 1/08, 15/08, 15/20
U.S. Cl. 156—156                                6 Claims

ABSTRACT OF THE DISCLOSURE

Process for producing a layer of insulating material on the interior of a conductive tube in which a tube of insulating material is extruded by an extruder head and expanded within the conductive tube as it is extruded by a second extruder head co-axial with the first head as the conductive tube is advanced, the insulating tube engaging the inner wall of the conductive tube at a point where the temperature of the latter is approximately equal to the melting temperature of the insulating material.

---

Reference is made to our co-pending application Ser. No. 18,666, filed Mar. 11, 1970 and entitled "Process and Apparatus for Lining Conductive Tubes With Insulating Material" which application relates to the same subject matter as this application and has issued as Pat. No. 3,643,727 on Feb. 22, 1972.

The present invention concerns a process for the continuous application of a tubular insulating lining on the inner wall of a tube, in particular an aluminum waveguide during its extrusion; also, it concerns the apparatus for carrying out said process.

Attempts heretofore made to solve in a technically reliable way the internal lining of extruded tubes with insulating material, in particular with thermoplastic synthetic resins, have encountered various difficulties.

One of the methods used up to the present time consists in practice in producing separately an aluminum tube and a lining of insulating material, as for instance polyethylene, which has an outer configuration as close as possible to the inner configuration of the aluminum tube. This lining, the thickness of which is of the order of tenths of millimeters, is inserted in collapsed position inside the tube and is then inflated in such a way as to adhere to it by pressure.

As has been experimentally ascertained, some difficulties are met for ensuring a perfect adherence between the two tubes, as air remains easily trapped between them. Moreover, the method permits lining of only relatively short tube lengths, so that the final product comprises an excessive number of joints which, in any case, represent critical zones in the waveguide, causing a concentration of losses which takes place at those points.

The present invention aims at eliminating the disadvantages of the methods heretofore known by providing a process for lining the inner surface of a tube of indefinite length; moreover, it allows the production of a truly uniform insulating layer.

More precisely, the object of the invention is a process for lining conductive tubes, in particular aluminum waveguides, with insulating material characterized in that the following operations are carried out simultaneously and in a continuous way: extruding a tube of conductive material; extruding coaxially inside it a tube of thermoplastic synthetic resin; admitting in the latter a gas under pressure able to act uniformly on its walls to expand it and to bring its outer surface into contact with the inner surface of the tube of conductive material, in a zone of the latter which is at a temperature approximately the melting temperature of the resin, but lower than the softening temperature of the same, in order to facilitate the intimate adhesion of the synthetic resin to the inner wall of the conductive tube.

A further object of the invention is an apparatus able to carry out the above described process, which comprises a first extrusion head for the conductive tube, consisting of an outer mould and of an inner mould, and is characterized in that a pipe, arranged coaxially inside said inner mould, is provided for conveying the thermoplastic synthetic resin in pasty condition to a second extrusion head, said second head comprising a male mould and a female mould forming the duct for conveying the resin towards the portion intended to extrude the tube of thermoplastic synthetic resin, said male mould being provided with an outlet for a gas under pressure coming from an appropriate channel, said conveying pipe protruding, with respect to the portion for the extrusion of the conductive tube, by such a length that the portion for the extrusion of the tube of synthetic resin is situated, with respect to said conductive tube under extrusion, in a position of the latter which has such a temperature as to produce the intimate adhesion between said conductive tube and said tube of thermoplastic synthetic resin in its expanded zone without causing the softening of the thermoplastic synthetic resin tube.

The single figure of the attached sheet of drawings represents diagrammatically, by way of example, a longitudinal median section of the extrusion head of the apparatus adapted to carry out the process according to the invention.

In said figure, a first extrusion head comprises an outer mould 4 and an inner mould 5, which define the conveying duct for the conductive material 2, for instance aluminum in pasty state and at a temperature of about 450° C., and the annular extrusion portion 3 for the conductive tube 17. Aluminum comes from a press, not shown in the figure, connected to the extrusion head 1.

A conveying pipe 12 for a polyethylene rod in pasty, state and at a temperature ranging between 180° and 250° C. extends coaxially inside the mould 5.

Polyethylene comes from an extruder, also not shown, which causes its advancement. This material is mentioned only by way of example, any other plastic material, as for instance polytetrafluoroethylene could be employed, provided that has a dielectric constant and high frequency losses of the order of those of polyethylene, e.g. a dielectric constant of less than 3.0 and a dissipation factor of less than 0.0005 at $10^6$ Hz.

Outside the pipe 12, but inside the mould 5 and coaxially to both of them, there is a means for adjusting the temperature of said conveying pipe 12, preferably a heat exchanger 11, into which is circulated a fluid able to regulate the temperature of said pipe 12.

The free end of the pipe 12 terminates in an extrusion head 7 constituted by a male mould 9 sustained by an appropriate supporting means or star wheel 10, positioned inside the pipe and coaxial with respect to it. The male portion 9 of the mould is surrounded by a female mould portion 8 which, together with it, defines a conveying duct 6 extending towards the annular section 16 intended to extrude the polyethylene.

Said male portion 9 is provided with a hole 14 for the admission of a gas under pressure supplied by an appropriate compressor, not shown through the duct 13.

The pipe 12 and the respective heat exchanger 11, surrounding it, protrude, with respect to the portion 3, where the aluminum is extruded, in such a way that the portion 16 for extruding polyethylene is arranged at such a distance from said portion 3 that the temperature reached by said pipe is of the order of 200° C. to allow the polyethylene tube 15, extruded from the annular portion 16 and then expanded, to adhere intimately to the conductive tube 17 without being softened.

Aluminum 2 in pasty condition, coming from a press, passes through the conveying duct defined by the outer mould 4 and by the inner mould 5 and is extruded to form the aluminum tube 17.

At the same time a rod of pasty polyethylene is caused to advance in the pipe 12 by an extruder towards the conveying duct 6, through which it reaches the annular portion 16, wherefrom it is extruded.

The forward speed for the extrusion of the polyethylene tube 15 is adjusted in accordance with the forward speed for the extrusion of the aluminum conductive tube 17 so that both are advanced at substantially the same speed.

Simultaneously with the two operations of extruding the aluminum tube 17 and the polyethylene tube 15, a jet of gas under pressure, preferably of an inert gas (as nitrogen, argon and so on) is admitted inside the polyethylene tube through the hole 14 present in the male mould portion 9. Such gas under pressure expands the polyethylene tube 15 in a uniform way and causes it to adhere progressively to the inner wall of the aluminum tube 17, so as to provide a uniform lining, the polyethylene tube 15 having a uniform thickness as it leaves the extrusion portion 16.

At the same time a temperature controlled fluid circulating in the heat exchanger 11, comprising the two chambers 11' and 11", maintain the temperature of the pipe 12 at the desired temperature.

It will be understood by those skilled in the art that the details of construction of the apparatus according to the invention can of course be varied as necessary without departing from the principles of the invention, one practical embodiment of which is described herein.

What is claimed is:

1. A process for lining the interior of a conductive metal tube with a layer of thermoplastic insulating material, the metal of said tube having a melting temperature higher than that of said insulating material, comprising extruding metal of said tube heated to a temperature above the melting point of said insulating material in tubular form and advancing the so-formed tube, said tube cooling as it is advanced, extruding an insulating tube of thermoplastic synthetic resin material within said conductive tube as the latter is advanced and at a point beyond the extrusion point of said conductive tube and admitting gas under pressure to the interior of said insulating tube to cause said latter tube to expand and contact the interior of said conductive tube at a portion thereof which has solidified, which has cooled to a temperature substantially equal to the melting temperature of said material and which is beyond said point of extrusion of said insulating tube, whereby said insulating tube adheres to the interior of said conductive tube and advances therewith.

2. A process as set forth in claim 1 wherein said metal is aluminum and said material has a high dielectric constant and low electrical losses at high frequencies.

3. A process as set forth in claim 2 wherein said material is selected from the group consisting of polyethylene and polytetrafluoroethylene.

4. A process as set forth in claim 1 wherein said gas is an inert gas.

5. A process as set forth in claim 4 wherein said inert gas is selected from the group consisting of nitrogen, argon and mixtures thereof.

6. A process as set forth in claim 1 wherein the temperature of said portion of said conductive tube is about 200° C.

References Cited

UNITED STATES PATENTS

| | | | |
|---|---|---|---|
| 3,527,667 | 9/1970 | Larsen et al. | 156—322 |
| 3,538,209 | 11/1970 | Hegler | 264—173 |
| 3,575,762 | 4/1971 | Goehring et al. | 156—322 |
| 2,944,298 | 7/1960 | Bernhardt et al. | 264—173 |
| 3,275,725 | 9/1966 | Utz | 264—209 |
| 3,160,917 | 12/1964 | Berggren et al. | 264—209 |
| 3,388,425 | 6/1968 | Detter | 264—173 |
| 3,376,181 | 4/1968 | Larson et al. | 264—173 |

FOREIGN PATENTS

| | | | |
|---|---|---|---|
| 6,708,009 | 12/1968 | Netherlands | 264—173 |

ROBERT F. WHITE, Primary Examiner

J. R. THURLOW, Assistant Examiner

U.S. Cl. X.R.

29—472.9: 156—244: 264—95. 173